(12) United States Patent
Kotzev et al.

(10) Patent No.: US 7,043,344 B2
(45) Date of Patent: May 9, 2006

(54) METHOD OF VEHICLE OPERATION IN AN ENVIRONMENT OF HIGH PSYCHOLOGICAL PRESSURE

(75) Inventors: Anat Kotzev, Givat Ela (IL); Dan Helfman, Tel Aviv (IL)

(73) Assignee: Rafael-Armament Development Authority Ltd., Haifa (IL)

( * ) Notice: Subject to any disclaimer, the term of this patent is extended or adjusted under 35 U.S.C. 154(b) by 0 days.

(21) Appl. No.: 10/251,814

(22) Filed: Sep. 23, 2002

(65) Prior Publication Data

US 2003/0060942 A1 Mar. 27, 2003

(30) Foreign Application Priority Data

Sep. 24, 2001 (IT) .................................. 1445593

(51) Int. Cl.
*G01C 21/00* (2006.01)
(52) U.S. Cl. ....................................................... 701/3
(58) Field of Classification Search ................ 701/1–5, 701/10–11, 14, 26, 27, 120, 200; 244/158 R, 244/162–163, 75 R–76 R, 175, 181, 183, 244/186, 188, 220–221, 96
See application file for complete search history.

(56) References Cited

U.S. PATENT DOCUMENTS

| 5,381,338 A | 1/1995 | Wysocki et al. |
| 5,396,644 A | 3/1995 | Tzidon et al. |
| 2001/0047229 A1* | 11/2001 | Staggs ............................ 701/3 |
| 2003/0034902 A1* | 2/2003 | Dickau ........................ 340/945 |

OTHER PUBLICATIONS

Bate et al "Heuristic Route Planning an Application to Fighter Aircraft", Artificial Intelligence Technology, McDonnell Aircraft Company, IEEE 1988 pp. 1114-1120.*

"Computer Modeling of Operator Mental Workload and situational Awareness in simulated Air-to-Ground Combat: An Assessment of Predictive Validity" See et al The Internation Journal of Aviation Psychology pp351-375.

"Validation Of The Explanatory Concept For Decision Support In Air-To-Air Combat" Crick et al; Proceedings of the Human Factors and Ergonomics Society 41st Annual meeting—1997.

"Analysis of the Gz Enviroment During air Combat Maneuvering in the F/A—18 Fighter Aircraft" Newman et al; Aviation, Space and Environmental Medicine vol. 70, No. 4 Apr. 1999.

(Continued)

*Primary Examiner*—Thu V. Nguyen
(74) *Attorney, Agent, or Firm*—Mark M. Friedman

(57) ABSTRACT

A vehicle such as a combat aircraft, and methods of operating one or more such vehicles. In each vehicle, a processor receives status reports from a plurality of vehicle subsystems faster than the pilot can assimilate them. The processor presents to the pilot, on a display, selections of at least one course of action, based on the current status reports. When a plurality of vehicles are operated, with one of the pilots being a commander of the plurality of vehicles, the selections are presented to the commander, who assigns initial courses of action to the other pilots. Subsequently, either the commander or the pilot of each vehicle may select the course of action for the vehicle.

5 Claims, 8 Drawing Sheets

OTHER PUBLICATIONS

"Cirrus SR20 Avionics" http://www.general-enterprises.com/avionics2.html.

Military Monitors Flight International 1 Jan. 2000, pp. 58-59.

http://www.techreview.com/magazine/mar01/freedman.asp "Flying made easy".

AIAA 99-4118 "The continuing Evolution of Real-Time Air Combat Simulation In A Secure Multi-Project Facility" Thomas Aug '99 Portland, Oregon (pp. 1-3).

"ITDL Simulation Architecture" American Institute of Aeronautics and Astronautics p. 4-8.

"Air Combat Decision Of Cooperative Multi-Target Attack And Its Neural Net Realization" Lin-sen et al; Acta Aeronautica et Astronautica Sinica vol. 20 No. 4 Jul. 1999.

"Artificial Neural Networks in Simulation of Pilot Manoeuvring During Air Combat" Rosander et al FFA, Bromma, Sweden pp 15.1-15.5.

"On the Interactive Technology in air Combat Simulation" Jing Tong et al; Acta Aeronautica et Astronautica Sinica vol. 21 No. 3 May 2000.

"Optimization For Air-Defense Combat Configuration Via Simulated Annealing Algorithm" Han Song-chen et al; Acta Aeronautica et Astronautica Sinica vol. 20 No. 5 Sep. 1999.

"Flight of Fantasy" Information Avionics pp45-51 / "The evolution of Avionic System Architectures" Paolo Quaranta Military Technology MILTECH Oct. 2000 / pp. 86-89 Cockpit Avionics—"Flying Smart" Flight International Mar. 7-13, 2000 pp.34-36.

\* cited by examiner

METHOD OF VEHICLE OPERATION IN AN ENVIRONMENT OF HIGH PSYCHOLOGICAL PRESSURE

FIELD AND BACKGROUND OF THE INVENTION

The present invention relates to a method of assisting the operator of a vehicle, in an environment of high psychological and/or physiological pressure, to make correct decisions about the operation of the vehicle. In particular, the present invention relates to the presentation of operational options to the pilot of a combat aircraft.

Although the scope of the present invention includes vehicular operation generally, the primary application of the present invention is to combat aircraft. Therefore, the operator of a vehicle is referred to herein as a "pilot", and the examples herein are directed towards aerial combat.

Aerial combat is an archtypical high pressure environment. A combat pilot must be aware at all times of factors related to the combat mission such as the targets available or designated for attack, the on-board resources available to attack these targets, the amount of fuel remaining on board relative to both attack opportunities and the need to return to base, enemy threats such as antiaircraft installations, and weather. Cockpit instrumentation provides the pilot with raw data related to these factors. The pilot must synthesize the information presented by the instrumentation and decide, based on the information, how to conduct the mission: which target to attack, how to approach the target, and whether to abort the mission. The overall situation is extremely fluid. For example, a potential target, such as an enemy aircraft, may at any time change from a target to a threat. Furthermore, in addition to the psychological stress of combat, a combat pilot is subject to physiological stresses such as high G-forces during high speed maneuvers. Studies of the abilities of combat pilots to cope with these stresses include Judi E. See and Michael A. Vidulich, "Computer modeling of operator mental workload and situational awareness in simulated air-to-ground combat: an assessment of predictive value", *The International Journal of Avialion Psychology*, vol. 8 no. 4 pp. 351–375; David G. Newman and Robin Callister, "Analysis of the Gz environment during air combat maneuvering in the F/A-18 fighter aircraft", *Aviation, Space, and Environmental Medicine* vol. 70 no. 4 (1999); and "Military monitors", *Flighit International* 1, January 2000, pp. 58–59. These studies tend to support the proposition that a combat pilot often is a victim of information overload. For example, while maneuvering to escape an air-to-ground missile, a pilot could easily fail to notice that he is about to crash into the ground.

There is thus a widely recognized need for, and it would be highly advantageous to have, a method of synthesizing the information available to a combat pilot to assist the pilot in making decisions in real time.

SUMMARY OF THE INVENTION

According to the present invention there is provided a method of operating a vehicle, including the steps of: (a) receiving a respective initial status report from each of a plurality of subsystems of the vehicle; (b) based on the initial status reports: (i) formulating at least one first course of action, and (ii) presenting the at least one first course of action to a pilot of the vehicle; (c) selecting one of the at least one course of action, by the pilot; (d) subsequently receiving a respective subsequent status report from each subsystem, the subsequent status reports being received continuously at a rate that exceeds an assimilation rate of the pilot; and (e) based on the subsequent status reports: (i) formulating at least one subsequent course of action, and (ii) if at least one of the at least one subsequent course of action differs from the selected course of action, presenting the at least one subsequent course of action to the pilot.

According to the present invention there is provided a method of operating a plurality of vehicles, each vehicle having a respective pilot, one of the pilots being a commander, the method including the steps of (a) for each vehicle, receiving a respective initial status report from each of a plurality of subsystems of the each vehicle; (b) based on the initial status reports: for each vehicle: (i) formulating at least one respective first course of action, and (ii) presenting the at least one respective first course of action to the commander; (c) for each vehicle, assigning one of the at least one respective first course of action to the each vehicle, by the commander; (d) for each vehicle, subsequently receiving a respective subsequent status report from each subsystem of the each vehicle, the subsequent status reports being received continuously at a rate that exceeds an assimilation rate of the pilot of the at each vehicle; and (e) based on the subsequent status reports: for each vehicle: (i) formulating at least one respective subsequent course of action, and (f) if, for one of the vehicles, at least one of the at least one respective subsequent course of action differs from the respective assigned course of action, presenting the at least one respective subsequent course of action to at least one pilot selected from the group consisting of the pilot of the one vehicle and the commander.

According to the present invention there is provided a vehicle including: (a) a plurality of subsystems that continuously generate respective status reports at a rate that exceeds an assimilation rate of a pilot of the vehicle; (b) a processor for receiving the status reports and formulating at least one course of action based thereon; and (c) a display for presenting the at least one course of action to the pilot.

According to the present invention there is provided a formation including a plurality of vehicles, each vehicle including: (a) a plurality of subsystems that continuously generate respective status reports at a rate that exceeds an assimilation rate of a pilot of the each vehicle; (b) a processor for receiving the status reports and formulating at least one course of action based thereon; (c) a display for presenting the at least one course of action to the pilot; and (d) a communications mechanism for exchanging the at least one course of action with at least one other vehicle.

The method of the present invention is directed at two phases of an aerial combat mission: entering combat and engaging in combat. Prior to entering combat, the various subsystems of each aircraft provide respective status reports. Based on these status reports, a computer on board each aircraft develops a menu of possible courses of action, relative to a set of predetermined ranked criteria, that are consistent with the status reports. The computer presents this menu to the pilot of the aircraft. The pilot then chooses one of those courses of action. In a multi-aircraft application, the mission commander receives all the menus of all the aircraft under his command and assigns respective courses of action to the other pilots under his command.

During combat, the subsystems of each aircraft continue to provide respective updated status reports. Because the rate at which the status reports is updated is too fast for a human pilot to assimilate, the computer assimilates the status reports to develop one or more possible courses of action, relative to the predetermined criteria. If one of the newly developed possible courses of action differs from the pilot's presently selected or assigned course of action (note that this will always be the case if the computer develops more than one course of action), the computer presents the pilot an updated menu of possible courses of action. Optionally, in a multi-aircraft application, the updated menus also are sent to the mission commander, and the mission commander assigns respective new courses of action to the other pilots under his command.

The aircraft subsystems include among others, consumables management subsystems and environmental subsystems. The consumables management subsystems are for managing on-board stores, like fuel and ordinance, that are consumed in the course of the mission. Among the criteria that the computer uses to develop the possible courses of action are thresholds below which the on-board stores may not fall without endangering the successful completion of the mission. The environmental subsystems are for monitoring the situation of the aircraft relative to the environment through which the aircraft flies, and/or for defining the relationship of the aircraft to the outside world. Examples of environmental subsystems include threat detection subsystems, navigation subsystems and meteorology subsystems.

Various aspects of the present invention are present separately in prior art systems. Most notably, there exist collision avoidance systems that warn the pilot of an aircraft, in real time, of impending collisions with other aircraft or with terrestrial obstacles. One such system is taught by Wysocki et al. in U.S. Pat. No. 5,381,338, which is incorporated by reference for all purposes as if fully set forth herein. These systems lack the mission planning aspect of the present invention, and also are directed towards advising the pilot relative to status reports received from only one subsystem: the navigation subsystem. (In the context of the present invention, the time-varying positions of other vehicles, as indicated by positional signals received from those other vehicles in a system such as that of Wysocki et al., are considered no different, in principle, from the static positions of stationary obstacles stored in a geographic data base: impending proximity to either is indicated by the navigation subsystem.)

Another prior art system that includes aspects of the present invention is the integrated in-flight planner of the Joint Strike Fighter, currently under development by Boeing and Lockheed-Martin for the United States Department of Defense. At the initiative of the pilot, an on-board computer system recommends new mission routes to improve survivability and lethality within the constraints of time-over-target and remaining fuel. Like the present invention, this prior art system assimilates status reports from both a consumables management subsystem (the fuel subsystem) and an environmental subsystem (the navigation subsystem) in order to make its recommendations. Unlike the present invention, this prior art system is activated only at the initiative of the pilot, who, in the heat of combat, may be oblivious to the need to plan new routes.

Known systems also lack the multi-vehicle aspect of the present invention.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of a method of operating a vehicle, or a group of vehicles, in a high pressure environment. Specifically, the present invention can be used to enable combat pilots to accomplish their missions more effectively.

The principles and operation of vehicular operation according to the present invention may be better understood with reference to the drawings and the accompanying description.

Figure 1:
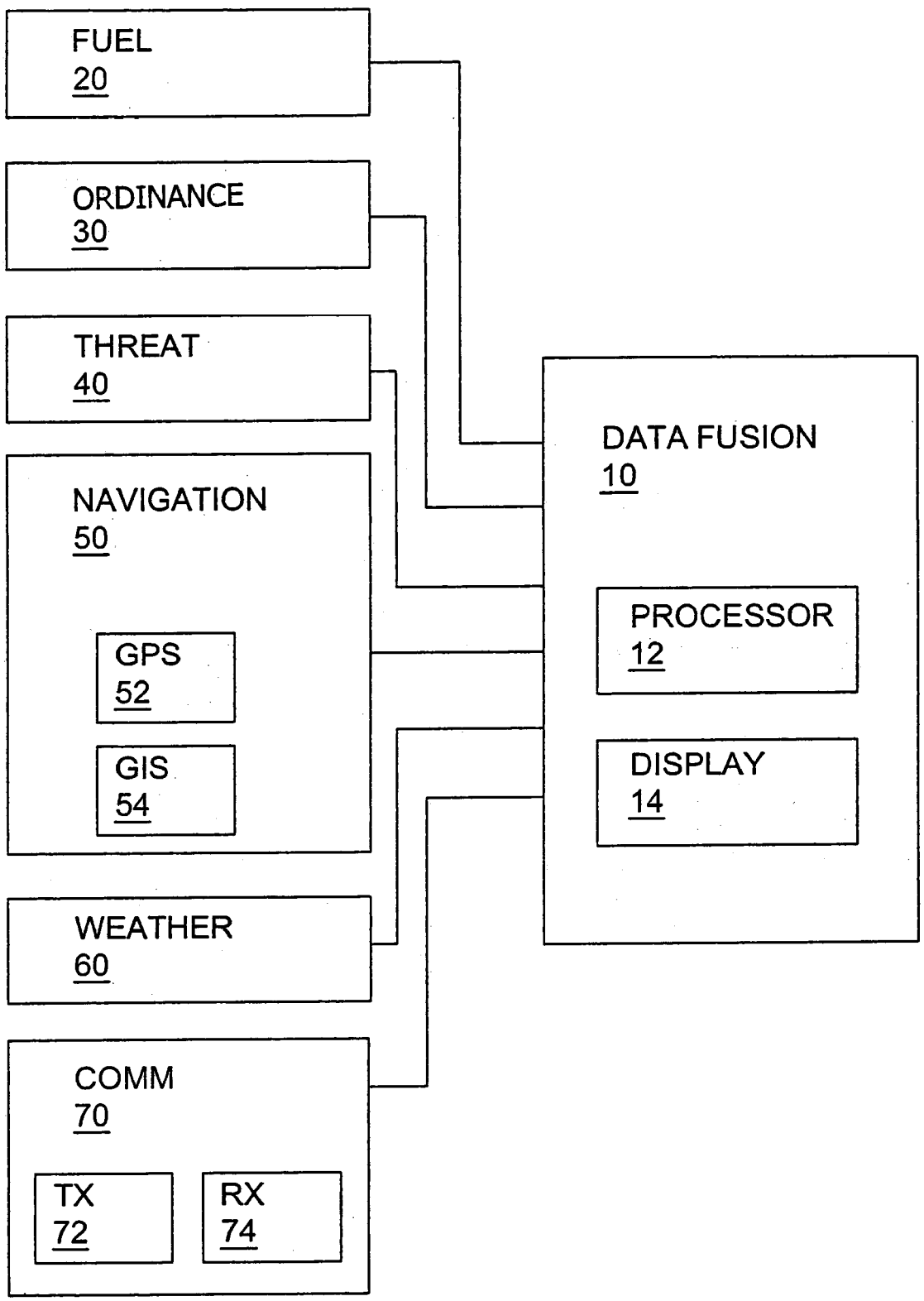
FIG. 1 is a high level block diagram of the subsystems of a combat aircraft.

Referring now to the drawings. FIG. 1 is a high level block diagram of the various subsystems of a combat aircraft 100 configured according to the present invention. There are three kinds of operational subsystems: consumables management subsystems, including a fuel subsystem 20 and an ordinance subsystem 30; environmental subsystems including a threat detection subsystem 40, a navigation subsystem 50 and a meteorology subsystem 60; and a communications subsystem 70.

Fuel subsystem 20 monitors the amount of fuel on board aircraft 100.

Ordinance subsystem 30 monitors the types and amounts of ordinance (air-to-air missiles, cannon shells, decoys, flares, etc.) on board aircraft 100. Ordinance subsystem 30 also includes a database of operational characteristics of the ordinance on board aircraft 100.

Threat detection subsystem 40 monitors the environment of aircraft 100 for indications of external threats, for example, signals from enemy radars that are locked onto aircraft 100. Threat detection subsystem 40 also includes a database of operational characteristics of enemy weapons systems.

Navigation subsystem 50 continually determines the geographical location of aircraft 100, both in absolute terms and relative to ground sites of interest, such as the home base of aircraft 100, alternate friendly landing fields, known enemy antiaircraft installations, etc. Navigation subsystem 50 includes a GPS receiver 52 for determining the geographical location of aircraft 100 and a geographic database 54 with information on the locations and other relevant characteristics of ground sites of interest. Among these ground sites of interest are enemy antiaircraft installations.

Meteorology subsystem 60 is a receiver configured to receive reports on weather conditions in the airspace that aircraft 100 is liable to traverse. Meteorology subsystem 60 stores these reports in a database that is similar to geographic database 54, the principal difference between the two databases being that the database of meteorology subsystem is dynamic, being updated whenever meteorology subsystem 60 receives a new report, whereas geographic database 54 is static.

Communications subsystem 70 is the local component of a communications system that aircraft 100, other aircraft and ground controllers use to exchange both voice communications and data communications. Communications subsystem 70 includes a transmitter 72 and a receiver 74.

Overall control of operational subsystems 20, 30, 40, 50, 60 and 70 is exercised by a supervisory (data fusion) subsystem 10. Supervisory subsystem 10 includes a processor 12 that continuously receives status reports from operational subsystems 20, 30, 40 and 50. Based on these status reports, and on data retrieved by supervisory subsystem 10 from data bases in operational subsystems 30, 40, 50 and 60, supervisory subsystem 10 formulates consequent courses of action, and uses a display 14 to present these courses of action to the pilot of aircraft 100. Pilot 100 then selects one of the courses of action, as described below. Optionally, supervisory subsystem 10 uses communications subsystem 70 to send the courses of action to other aircraft and/or to receive from the other aircraft their own courses of action, also as described below.

Implementational details of subsystems 10, 20, 30, 40, 50, 60 and 70 are familiar to those skilled in the art and need not be repeated here. For example, methods of displaying optional courses of action to combat pilots are discussed by Jeffrey L. Crick et al. in "Validation of the explanatory concept for decision support in air-to-air combat". *Proceedings of the Human Factors and Ergonomics Society* $41^{st}$ *Annual Meeting*-1997, paper A98-12676. As another example, a method and system for managing voice and data communication among combat aircraft is taught by Tzidon et al. in U.S. Pat. No. 5,396,644. The present invention is an innovative combination of these prior art subsystems that enables the pilot of aircraft 100 to decide on a course of action under the stress of combat despite the fact that operational subsystems 20, 30, 40, 50 and 60 are delivering their status reports at a rate too fast for the pilot of aircraft 100 to assimilate.

Figure 2:
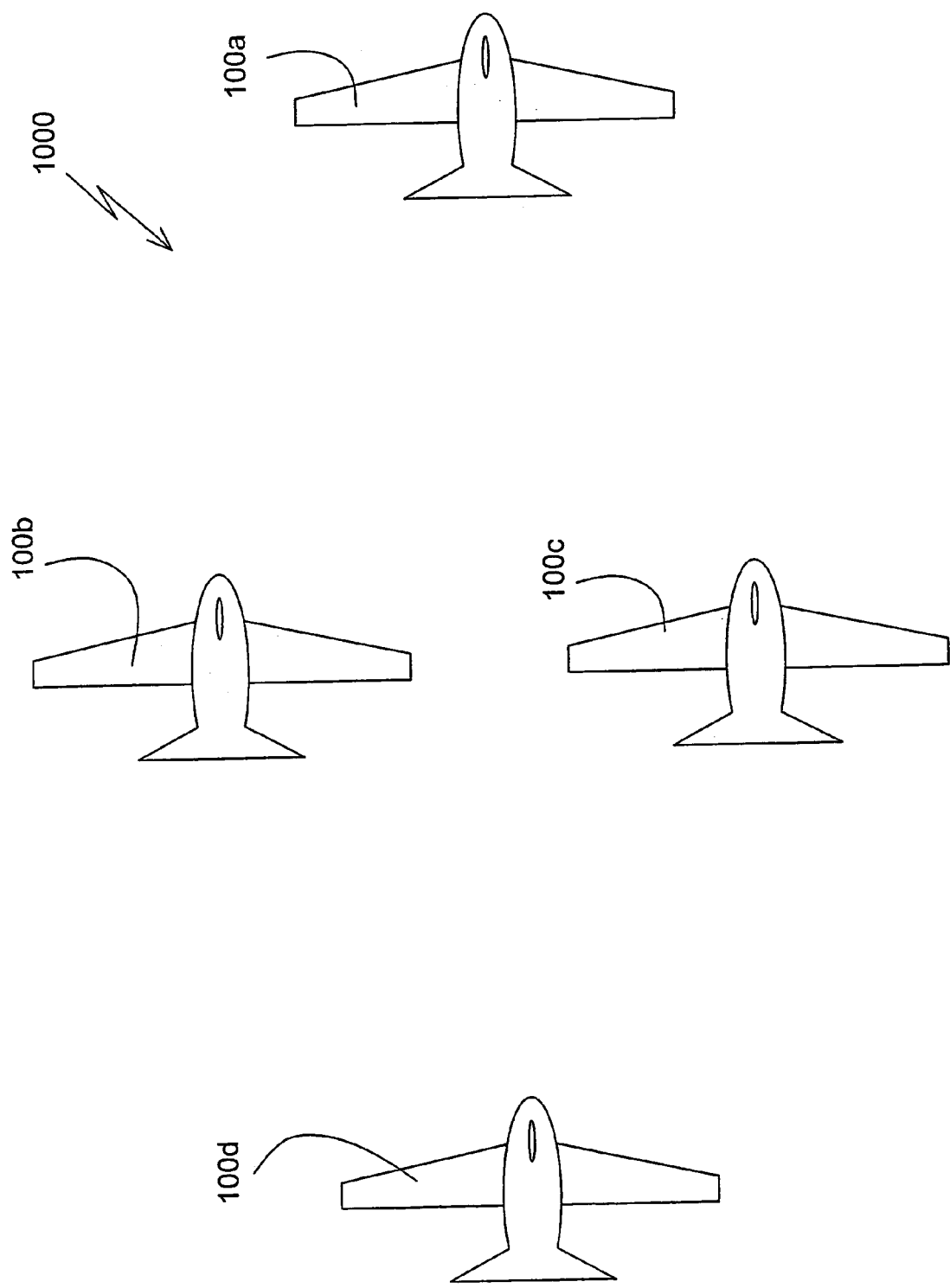
FIG. 2 shows a formation of four combat aircraft.
Figure 3:
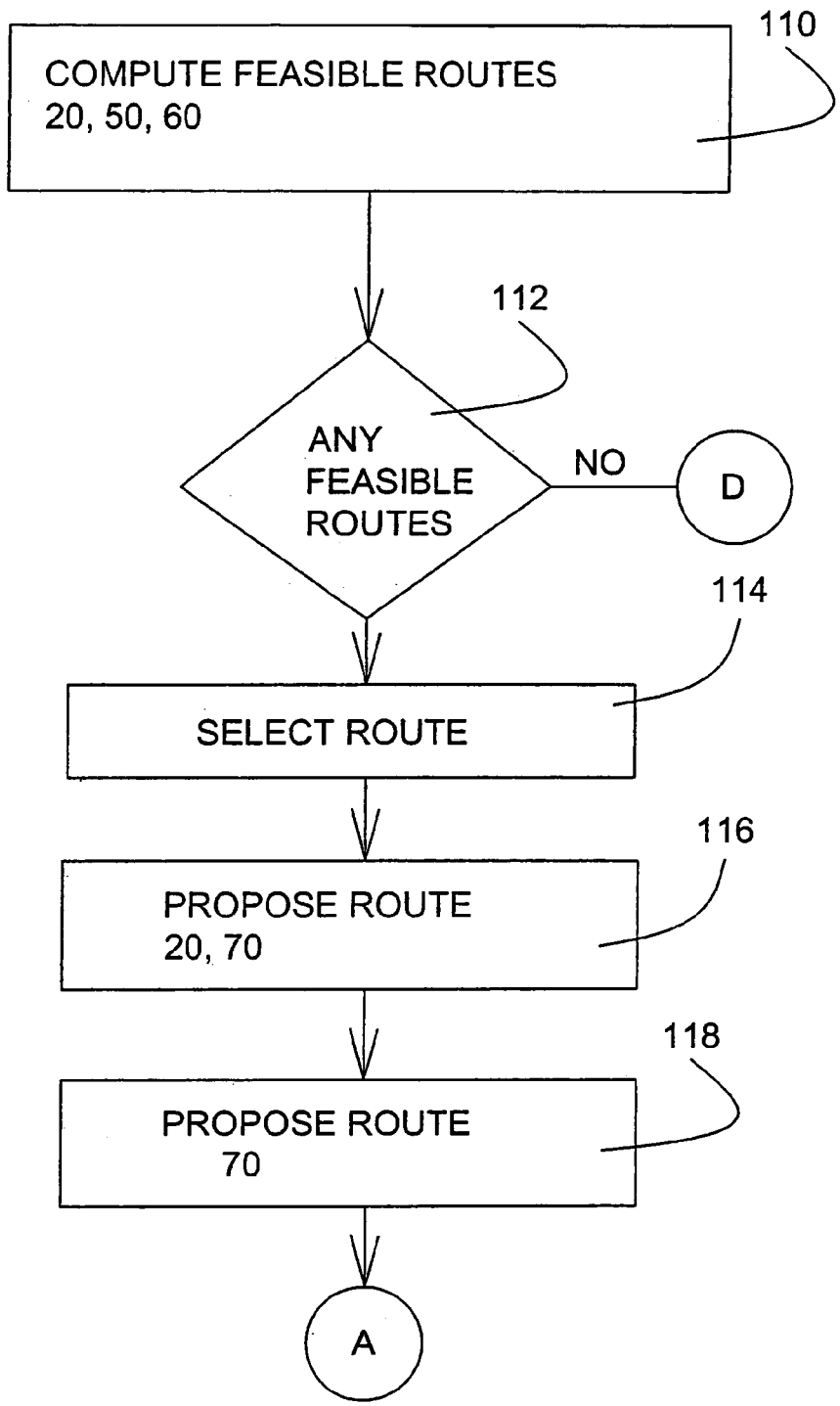
FIGS. 3–8 presents a flow chart of a combat mission according to the present invention.
Figure 4:
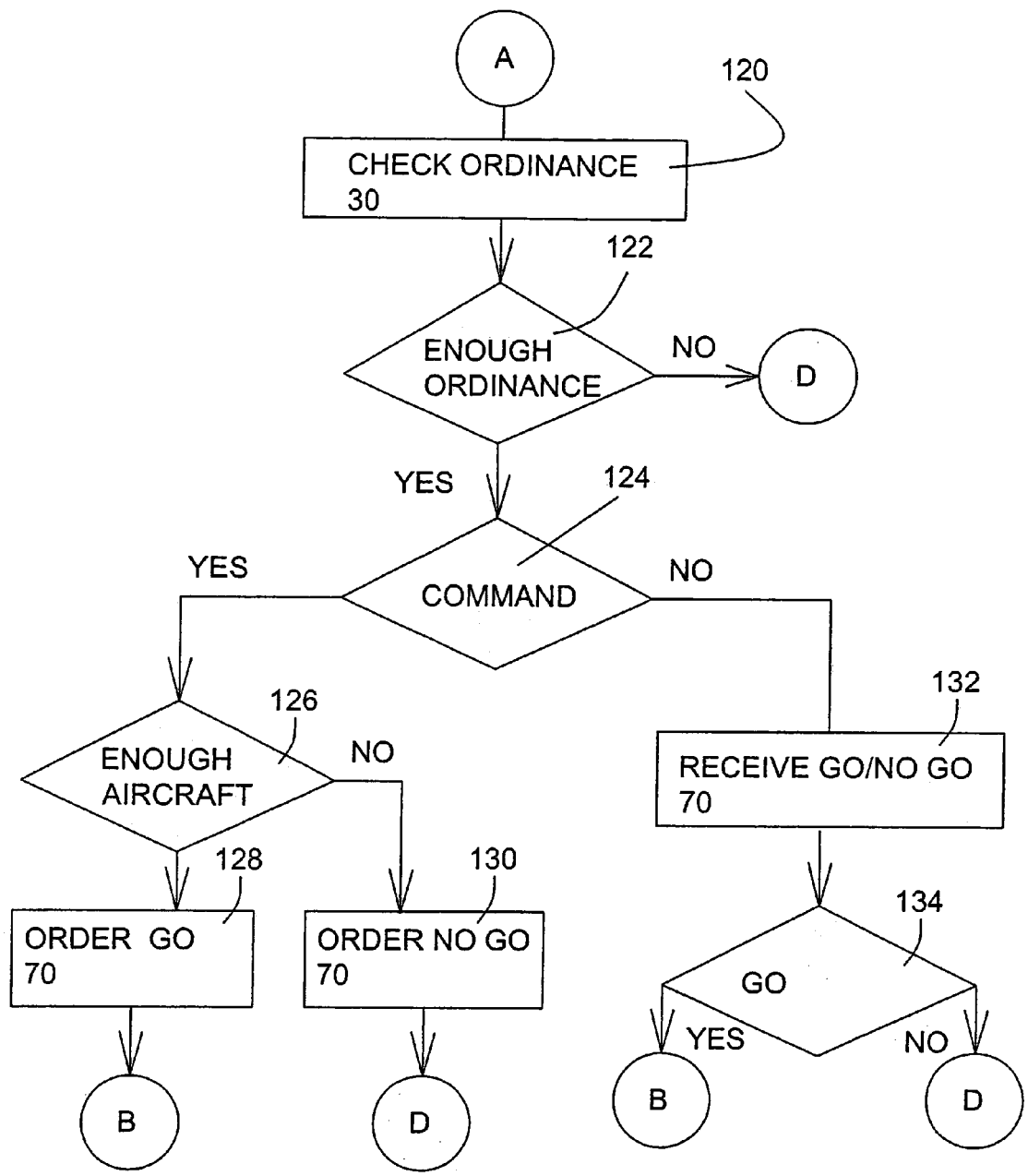

The present invention now will be explained with reference to a specific example: a mission carried out by a formation 1000 of four fighter aircraft 100*a*, 100*b*, 100*c* and 100*d* (see FIG. 2). The pilot of aircraft 100*a* is the formation commander, so that aircraft 100*a* is the command aircraft. The pilots of the other aircraft 100 are subordinate pilots, so that the other aircraft 100 are subordinate aircraft. The mission objective is to defend friendly forces against attack by enemy aircraft. For example, formation 1000 could be providing cover over a battlefield, or could be escorting bombers that attack enemy targets.

FIGS. 3–8 present a flow chart of the conduct of the mission according to the present invention. This flow chart includes two kinds of blocks: rectangles and diamonds. The rectangles represent activities of either supervisory subsystem 10 or a pilot. The diamonds at the branch points represent decisions taken by either supervisory subsystem 10 or by a pilot, with the exception of the three diamonds 124, 145 and 166 labeled "COMMAND". The "YES" branch of a COMMAND diamond is the branch taken by command aircraft 100*a*. The "NO" branch of a COMMAND diamond is the branch taken by subordinate aircraft 100*b*, 100*c* and 100*d*. Numbers within rectangles are the reference numerals of the operational subsystems that participate in the indicated activities.

At the beginning of the mission (block 110), supervisory subsystem 10 of each aircraft 100 computes a set of feasible routes for that aircraft. A feasible route is a rote along which the aircraft can fly, perform the mission, and still return to base. Supervisory subsystem 10 computes feasible routes on the basis of the available fuel, as reported in a status report from fuel subsystem 20, and on the basis of information obtained by interrogating the databases of navigation subsystem 50 and meteorology subsystem 60. A feasible route must satisfy the following criteria:

1. Fuel threshold: There must be enough fuel on board to traverse the route and return to base, with a reserve for aerial combat.

2. Danger threshold 1: The route must keep aircraft 100 out of range of enemy antiaircraft installations.

3. Danger threshold 2: The route must keep aircraft 100 at a safe distance from dangerous weather conditions such as thunderstorms.

These thresholds are functions of the criticality of the mission. For example, in a mission that must be performed "at all costs", aircraft 100 will be allowed to approach closer to enemy antiaircraft installations or dangerous weather conditions, and will be allowed to embark on the mission with less fuel on board, than in a less critical mission.

Figure 7:
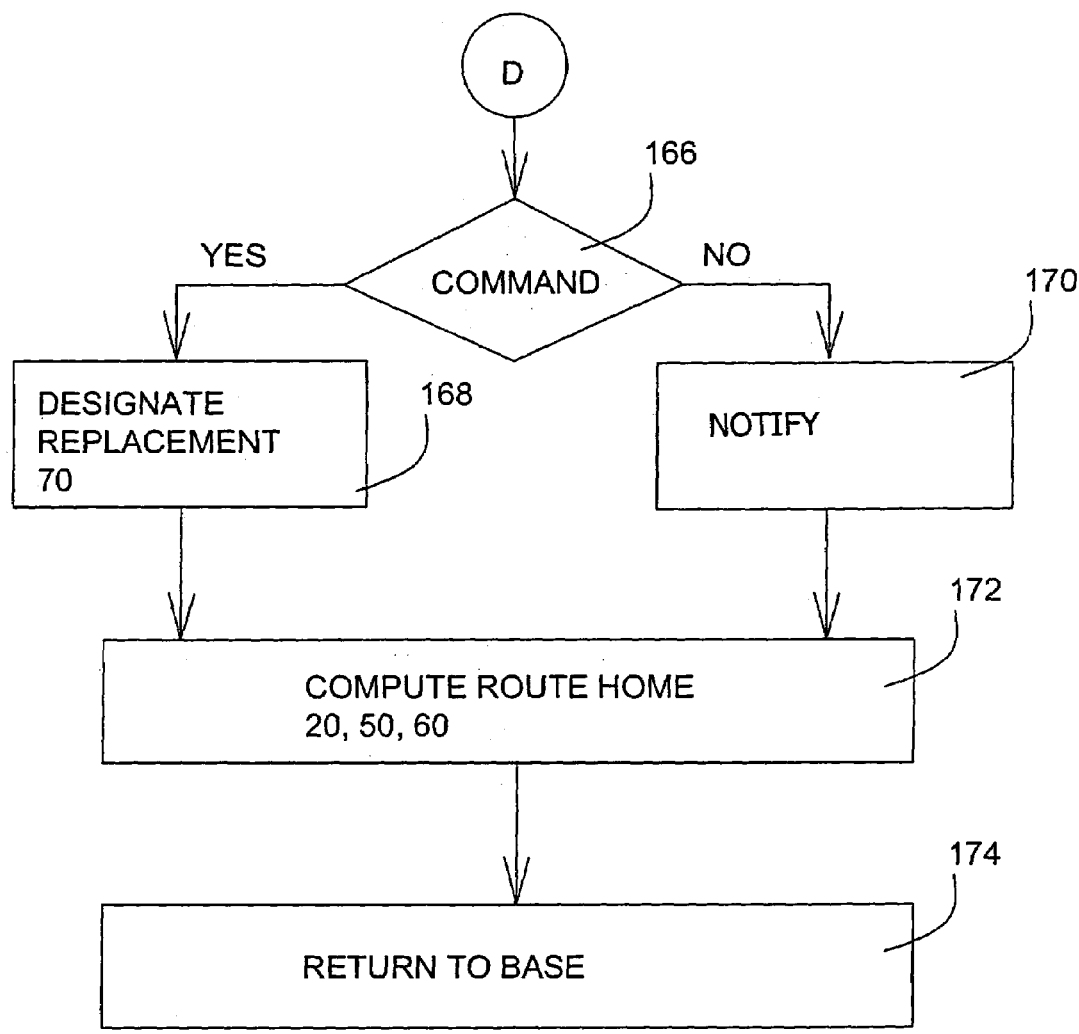

Any aircraft that has no feasible routes (block 112) aborts its mission (FIG. 7). Each of the pilots of the remaining aircraft 100 selects the route he wants to fly (if he is presented with more than one route)(block 114). The subordinate pilots report their selected routes to the commander, using communications subsystems 70 of their respective aircraft 100 (block 116), along with indications of how much fuel is required for the selected routes and how much fuel, as reported by fuel subsystem 20, is on board each aircraft 100. Based on these reports, and on his own selected route, the commander selects a common route (block 118) and informs the other pilots of the selected common route, using communications subsystem 70 of aircraft 100*a*.

Supervisory subsystem 10 of each aircraft 100 now compares the types and amounts of on-board ordinance to the types and amounts of ordinance needed to carry out the mission (block 122), based on the most recently received status report from ordinance subsystem 30 of that aircraft 100 (block 120). Any aircraft 100 with insufficient ordinance aborts its mission (FIG. 7). The relevant ordinance threshold also is a function of the criticality of the mission. The commander now decides whether there are enough aircraft 100 available to complete the mission (block 126). This decision, too, depends on the criticality of the mission. If enough aircraft are available, the commander uses communications subsystem 70 of aircraft 100*a* to order the other aircraft 100 to commence the mission (block 128). Otherwise, the commander uses communications subsystem 70 of aircraft 100*a* to order the other aircraft 100 to abort the mission (block 130). The subordinate pilots receive the go/no-go order via communications subsystems 70 of their own aircraft 100 (block 132) and act accordingly (block 134).

The order in which thresholds are checked in the premission phase reflects the ranking of the go/no-go criteria, from most important to least important:

1. Does aircraft 100 have enough fuel on board to reach the designated target (in an escort mission) or to stay aloft for a sufficient amount of time (in a cover mission) at all?

2. Given sufficient fuel, does aircraft 100 have enough ordinance onboard to execute the mission?

3. Do enough aircraft 100 pass the fuel and ordinance thresholds to execute the mission?

Figure 5:
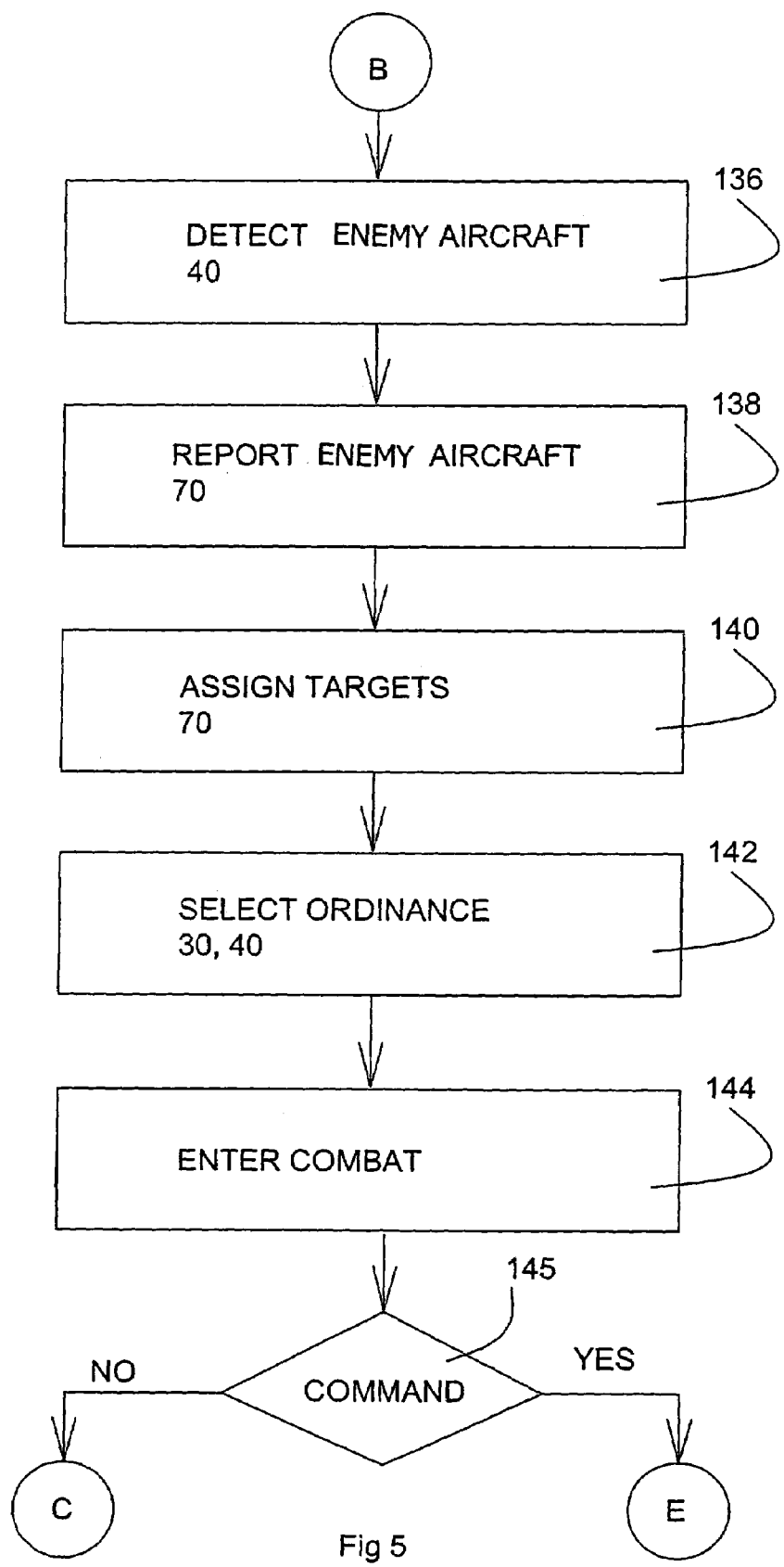

The mission proper now begins, as shown in FIG. 5. When threat detection subsystem 40 of one of aircraft 100 detects approaching enemy aircraft (block 136) and sends a corresponding status report to supervisory subsystem 10 of that aircraft 100, supervisory subsystem 10 of that aircraft 100 uses communications subsystem 70 of that aircraft to relay the status report to the other aircraft (block 138). Supervisory subsystems 10 of the other aircraft 100 treat this status report in the same way as status reports from their own threat detection subsystems 30. In particular, supervisory subsystem 10 of aircraft 100*a* displays the detected threat to the commander, using display 14. The commander assigns his own aircraft 100*a* and the other aircraft 100 to deal with respective enemy aircraft, and notifies the other pilots of which enemy aircraft each one of them has been assigned to deal with, using communications subsystem 70 of aircraft 100a (block 140). With the assistance of supervisory subsystem 10, which obtains the operational characteristics of the assigned target from the database of threat detection subsystem 40 and which obtains the operational characteristics of the available ordinance from the database of ordinance subsystem 30, each pilot selects ordinance to deploy against his assigned target (block 142). All aircraft 100 drop their external fuel tanks, and formation 1000 now enters combat (block 144.)

Figure 6:
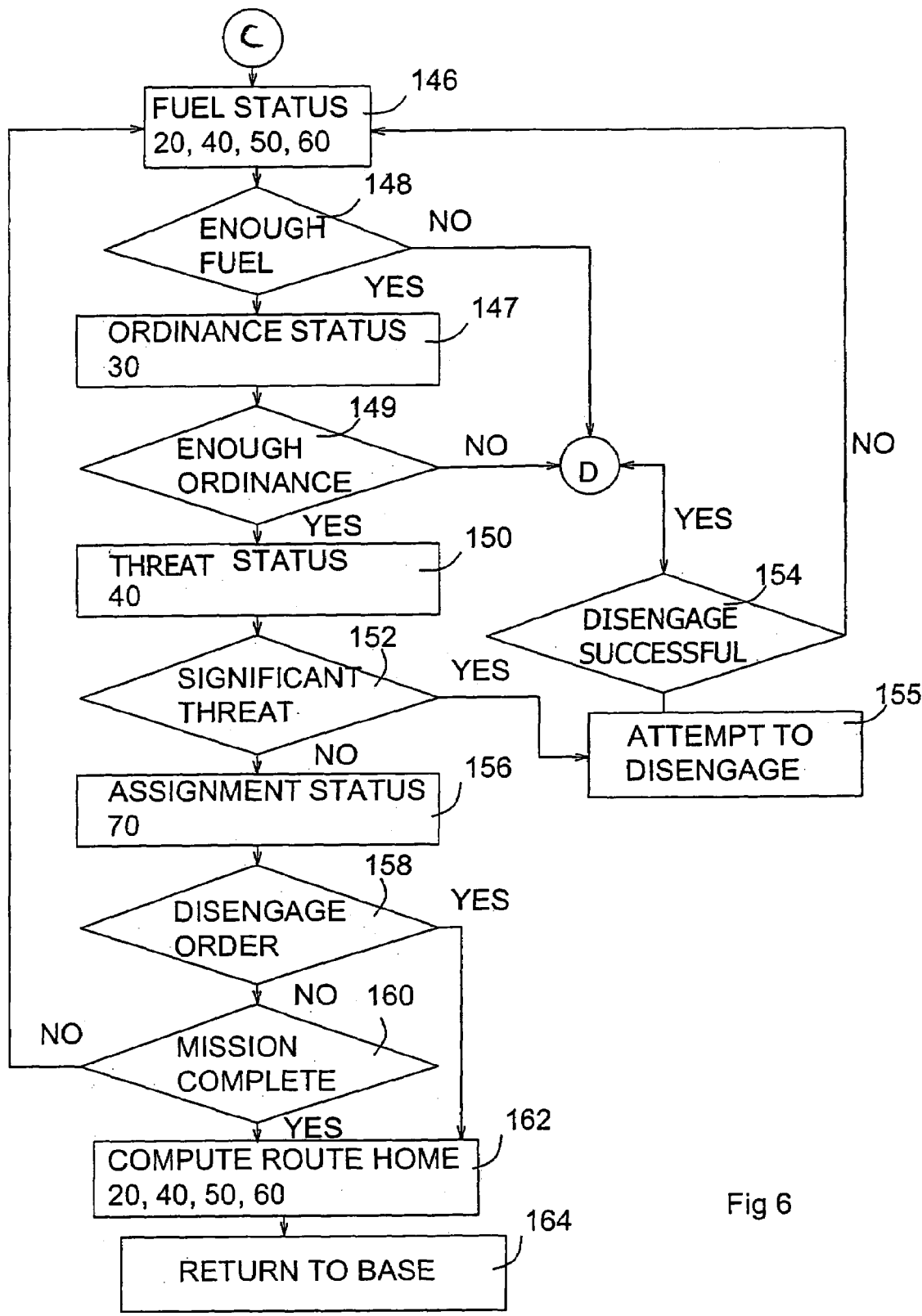
Figure 8:
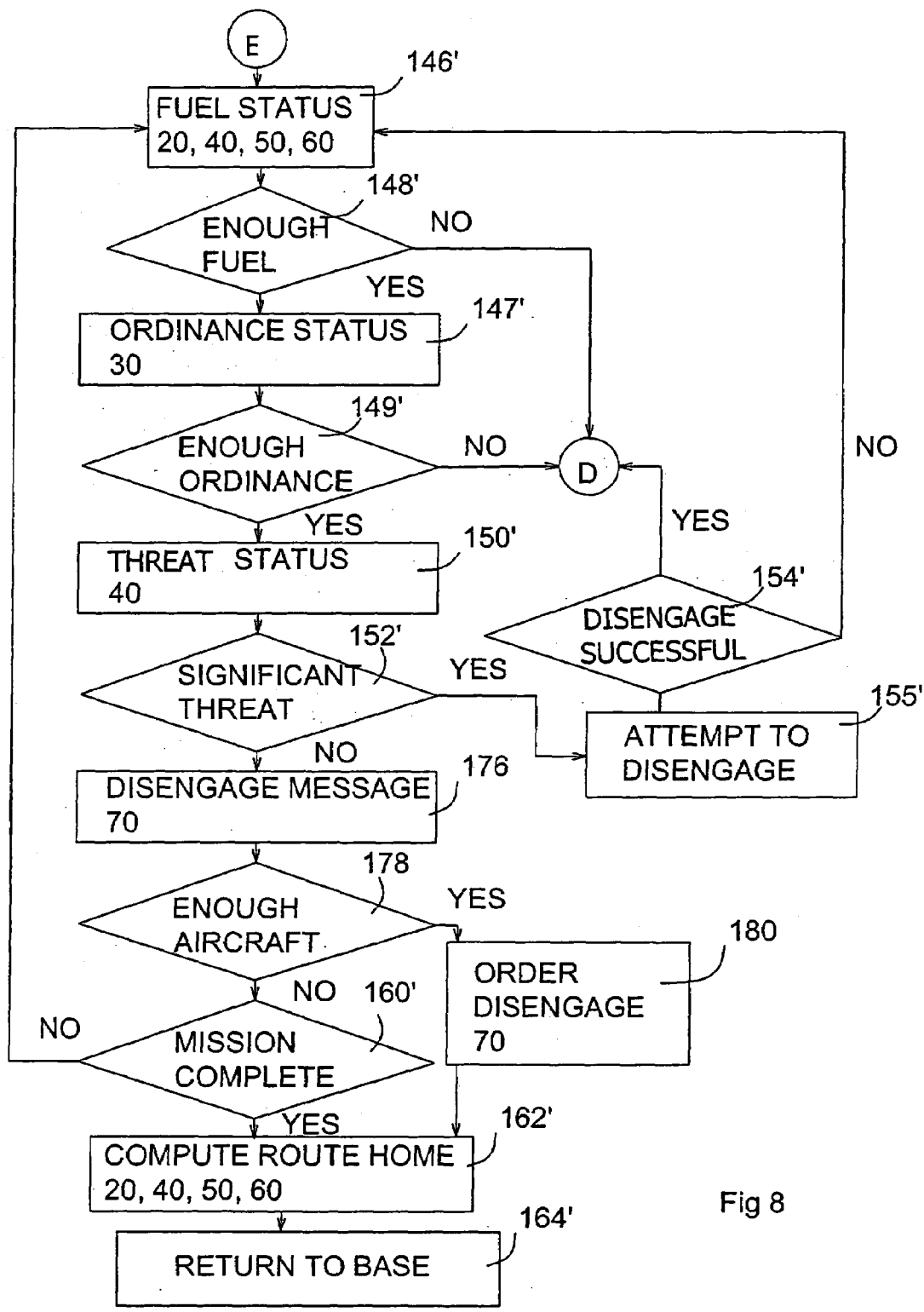

During combat, the present invention operates in a closed loop, as illustrated in FIG. 6 for a subordinate aircraft 100b, 100c or 100d and in FIG. 8 for command aircraft 100a. In block 146 or 146', supervisory subsystem 10 continuously revises a set of feasible routes back to the home base of aircraft 100, based on status reports from fuel subsystem 20 of the amount of fuel remaining on-board and from navigation subsystem 50 of the location of aircraft 100, in the light of the locations of fixed threats as stored in the database of threat detection subsystem 40 and in the light of the locations of weather hazards as stored in the database of meteorology subsystem 60. If the amount of fuel falls below a safe threshold (block 148 or 148'), supervisory subsystem 10 recommends to the pilot of aircraft 100 that he disengage and return to base (FIG. 7). In block 147 or 147', supervisory subsystem 10 receives a status report from ordinance subsystem 30 of the amount and types of ordinance remaining on-board. If there is insufficient ordinance on board for aircraft 100 to continue the mission (block 149 or 149'), supervisory subsystem 10 recommends to the pilot of aircraft 100 that he disengage and return to base (FIG. 7). In block 150 or 150', supervisory subsystem 10 receives a status report from threat detection subsystem 40. If the threat is significant (block 152 or 152'), supervisory subsystem 10 recommends evasive action to the pilot of aircraft 100. An example of a significant threat is that during the course of a dogfight, an enemy aircraft may get behind one of aircraft 100 and lock its radar onto that aircraft 100. Depending on the severity of the threat and the success or lack thereof of the evasive action, the pilot of aircraft 100 may decide to attempt to disengage and return to base (block 154 or 154'). If the pilot of aircraft 100 succeeds in disengaging (block 155 or 154'; he proceeds as in FIG. 7. If the pilot of aircraft 100 either chooses not to disengage or is unable to disengage, he continues the engagement and supervisory subsystem 10 continues to monitor the status reports from fuel subsystem 20 and threat detection subsystem 40 (blocks 146 and 150 or blocks 146' and 150').

The recommendations presented by supervisory subsystem 10 to a pilot may be single recommendations or may be menus that include several recommendations. For example, if the impending threat reported by threat detection subsystem 40 in block 150 or block 150' is an infrared homing missile, supervisory subsystem 10 may recommend several evasive actions such as "release a flare" or "turn hard left".

As described below in the context of FIG. 7, disengaging (from blocks 148, 148', 149, 149', 154 and 154') includes informing the commander that formation 1000 now includes one less aircraft. Formally, the receipt by supervisory subsystem 10 of aircraft 100a via communications subsystem 70 of aircraft 100a of a disengagement message is a status report about the status of formation 1000 as a whole, and is represented as such in FIG. 8 as block 176. If the number of aircraft remaining is less than the number needed to execute the mission (block 178), the commander uses communications subsystem 70 of aircraft 100a to order disengagement by all aircraft (block 180). In block 156, supervisory subsystem 10 of each subordinate aircraft 100 checks for the receipt of a disengagement order via communications subsystem 70 of that aircraft 100. If a disengagement order is issued (block 180) and received (block 158), supervisory subsystem 10 of each aircraft 100 computes the best route home (block 162 or 162'), based on the amount of fuel on board, the location of aircraft 100, and the hazards listed in the databases of threat detection subsystem 40 and meteorology subsystem 60; and aircraft 100 returns to base (block 164 or 164'). If a disengagement order is not issued, then the pilot of aircraft 100 continues the engagement, and supervisory subsystem 10 continues to monitor the status reports from fuel subsystem 20 and threat detection subsystem 40 (blocks 146 and 150 or blocks 146' and 150') until the mission is complete (block 160 or 160'). When the mission is complete, supervisory subsystem 10 of each aircraft 100 computes the best route home (block 162 or 162'), based on the amount of fuel on board, the location of aircraft 100, and the hazards listed in the databases of threat detection subsystem 40 and meteorology subsystem 60; and aircraft 100 returns to base (block 164 or 164').

As in the pre-mission phase, the fuel, ordinance and aircraft number thresholds, on which the disengagement decisions of blocks 148, 148', 149, 149' and 178 are based, are functions of the criticality of the mission. Also as in the pre-mission phase, the order in which thresholds are checked reflects the ranking of the engage/disengage criteria:

1. Considering each aircraft 100 separately, does aircraft 100 have enough fuel on board to continue the mission?

2. Still considering each aircraft 100 separately, does aircraft 100 have enough ordinance on board to continue the mission?

3. After considering the fuel and ordinance thresholds of all the aircraft, are there enough aircraft 100 left in formation 1000 to continue the mission?

As noted above, the purpose of the closed loop operation shown in FIGS. 6 and 8 is to enable the pilot of aircraft 100 to devote his attention to destroying enemy targets and evading enemy threats, without having to monitor the amount of fuel and ordinance on board aircraft 100, and without having to keep checking a threat display to see if there are any significant threats near aircraft 100. If fuel or ordinance runs low or if a significant threat develops, supervisory subsystem 10 notifies the pilot of aircraft 100 of that development.

FIG. 7 shows the abort/disengage procedure. In box 170, a subordinate aircraft 100 notifies command aircraft 100a of its intention to abort or disengage and return to base, via the respective communications subsystems 70. If the commander needs to abort or disengage, he must first designate one of the subordinate pilots as a replacement commander (block 168). The discussion above of the activities of the commander and of command aircraft 100a should be understood as referring to the replacement commander and the replacement commander's aircraft 100 subsequent to such a departure of command aircraft 100a. Supervisory subsystem 10 of an aborting or disengaging aircraft 100 then computes the best route home (block 172), based on the amount of fuel on board, the location of aircraft 100, and the hazards listed in the databases of threat detection subsystem 40 and meteorology subsystem 60; and aircraft 100 returns to base (block 174).

While the invention has been described with respect to a limited number of embodiments, it will be appreciated that many variations, modifications and other applications of the invention may be made.

What is claimed is:

1. A method of operating a plurality of vehicles, each said vehicle having a respective pilot, one of the pilots being a commander, the method comprising the steps of:
   (a) for each vehicle, receiving a respective initial status report from each of a plurality of subsystems of said each vehicle;
   (b) based on said initial status reports: for each vehicle:
      (i) formulating at least one respective first course of action, and
      (ii) presenting said at least one respective first course of action to the commander;
   (c) for each vehicle, assigning one of said at least one respective first course of action to said each vehicle, by the commander;
   (d) for each vehicle, subsequently receiving a respective subsequent status report from each said subsystem of said each vehicle, said subsequent status reports being received continuously at a rate that exceeds an assimilation rate of the pilot of said each vehicle; and
   (e) based on said subsequent status reports: for each vehicle:
      (i) formulating at least one respective subsequent course of action, and
      (ii) if, for one of the vehicles, at least one of said at least one respective subsequent course of action differs from said respective assigned course of action, presenting said at least one respective subsequent course of action to at least one pilot selected from the group consisting of the pilot of said one vehicle and the commander.

2. The method of claim 1, wherein said at least one respective subsequent course of action of said one vehicle is presented to the pilot of said one vehicle, the method further comprising the step of:
   (f) selecting one of said at least one respective subsequent course of action, by said pilot of said one vehicle.

3. The method of claim 1, wherein said at least one respective subsequent course of action of said one vehicle is presented to the commander, the method further comprising the step of:
   (f) assigning one of said at least one respective subsequent course of action to said one vehicle, by the commander.

4. The method of claim 1, wherein formulating is relative to a predetermined ranked plurality of criteria.

5. The method of claim 4, wherein said courses of action are relative to a mission, and wherein said criteria include a minimum number of vehicle needed to complete said mission.

* * * * *